Jan. 17, 1928. 1,656,641
E. L. LEINBACH
SHOCK ABSORBER
Filed Oct. 4, 1926  2 Sheets-Sheet 2
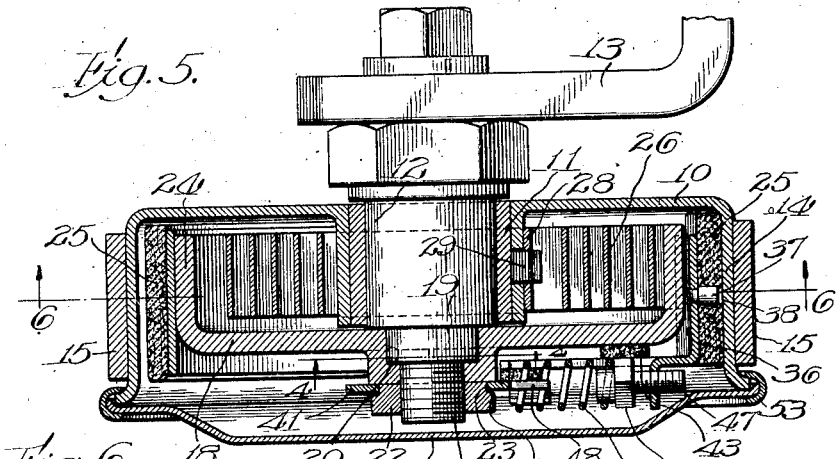
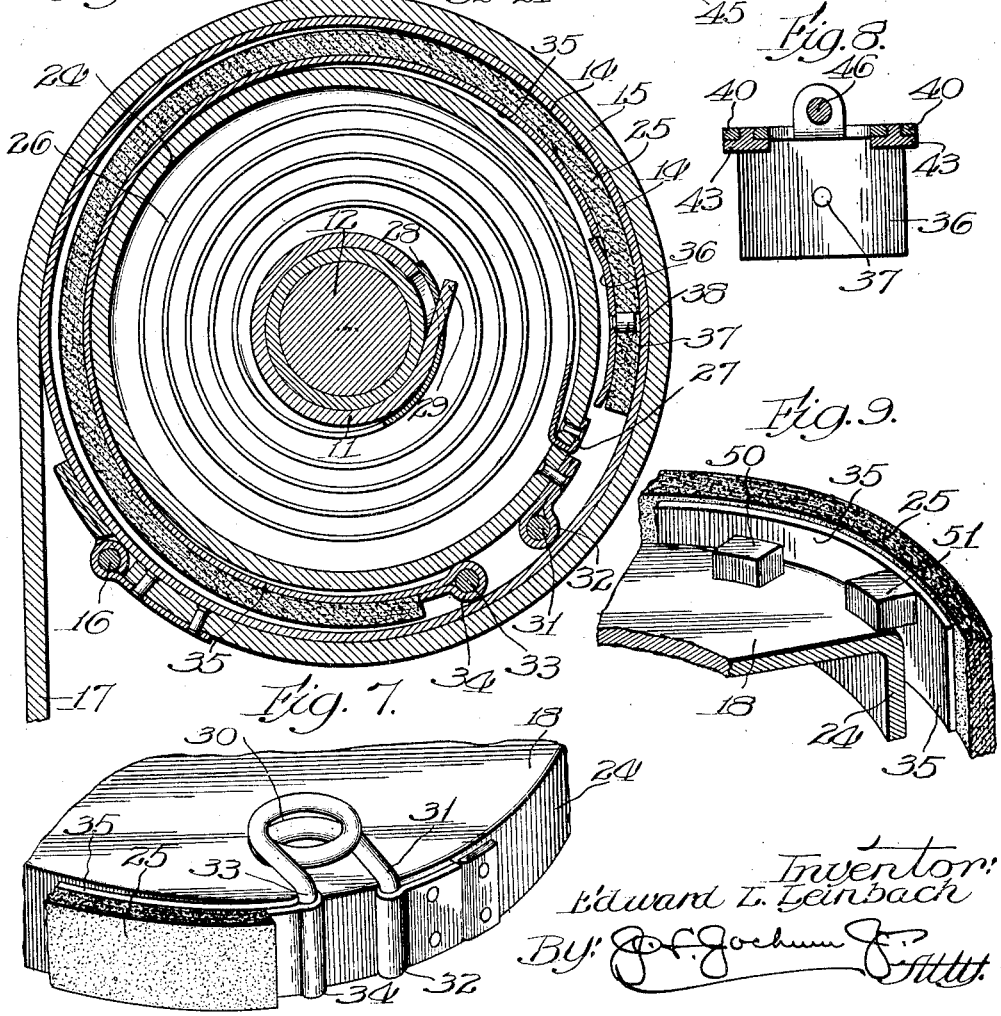
Inventor:
Edward L. Leinbach Patented Jan. 17, 1928.

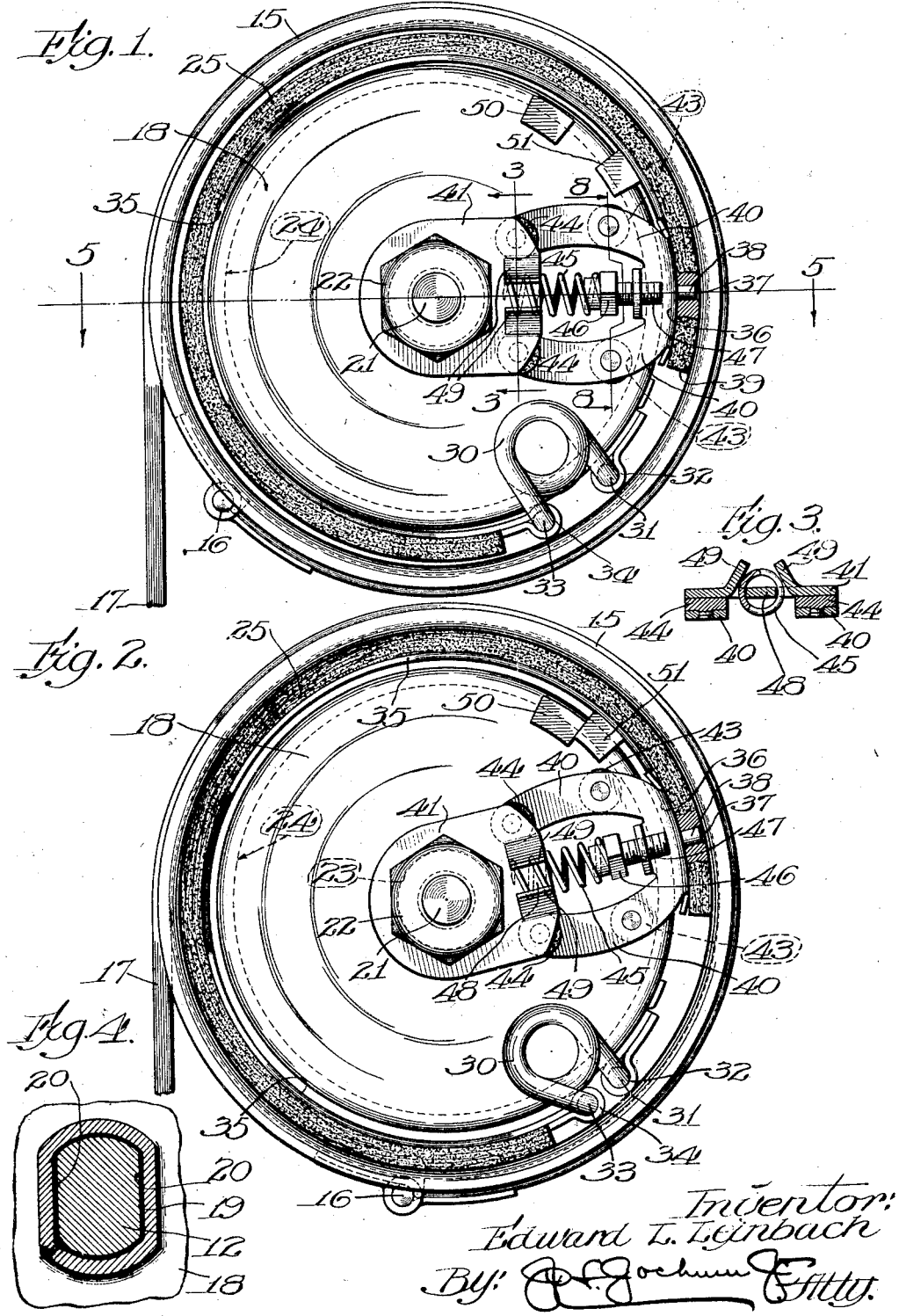

1,656,641

UNITED STATES PATENT OFFICE.

EDWARD L. LEINBACH, OF CHICAGO, ILLINOIS.

SHOCK ABSORBER.

Application filed October 4, 1926. Serial No. 139,383.

This invention relates to improvements in shock absorbers particularly adapted though not necessarily limited in its use for controlling the movements or variations of supporting springs of vehicles relative to the running gear frame, which does not affect the action of the springs in compressing but retards or modifies the rebound or upward movement of the springs when they are subjected to violent shocks and rebounds due to obstructions or irregularities in the road bed.

A further object is to provide an improved shock absorber of this character, having means for controlling the maximum amount of friction in the shock absorber.

A further object is to provide an improved shock absorber of this character which will permit the vehicle springs to have a limited degree of free movement under normal conditions and during which time the shock absorber will be inactive with respect to modifying or retarding the spring action, but which will quickly and automatically be rendered active by the slightest abnormal condition.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a face view of a shock absorber constructed in accordance with the principles of this invention and with the cap or cover plate removed, showing the parts in one position to permit a limited degree of free movement under normal conditions.

Figure 2 is a view similar to Figure 1 showing the parts in another position in which the friction is applied to the fullest extent.

Figure 3 is a detail sectional view taken on line 3—3, Figure 1.

Figure 4 is a detail sectional view taken on line 4—4, Figure 5.

Figure 5 is a sectional view taken on line 5—5, Figure 1.

Figure 6 is a sectional view taken on line 6—6, Figure 5.

Figure 7 is a detail perspective view of a portion of one of the drums and the anchoring means for one end of the friction band.

Figure 8 is a detail sectional view taken on line 8—8, Figure 1.

Figure 9 is a detail perspective view of another portion of the friction band showing the co-operating stops or portions for determining the maximum amount of a load or degree of friction to be applied by the friction band.

In the present invention the resistance to the recoil of the springs of the vehicle is obtained by friction by means of the action of a suitable split friction band interposed between concentrically arranged drum like members, one of which is fixed or stationary and the other being oscillatable about the fixed drum.

One end of the friction band is yieldingly anchored to the stationary or fixed drum, the other end of the band being free but yieldingly and frictionally anchored to the other drum so that when the drums are rotated in one direction, one with relation to the other, the band will be contracted to permit a free and easy movement between the drums, but when the drums are relatively rotated in the opposite direction, friction created between the band and one of the drums will cause the band to expand to increase the friction between the band and one of the drums, with the result that the relative movement of the drums will be retarded.

Means are also provided whereby the maximum amount of friction thus created may be controlled at the high point or at the point generally known or designated as the peak load of friction.

Referring more particularly to the drawings the numeral 10 designates generally a drum like member which is provided with a bearing 11 to receive a trunnion 12, which latter is connected with a bracket 13 or any suitable support.

Extending about the periphery 14 of the drum is a flexible member or strap 15, one end of which is anchored as at 16 in any suitable manner to the periphery of the drum, and the member 15 encompasses the drum and is adapted to be wound thereupon and unwound therefrom, the free end 17 of the member 15 being adapted to be anchored by one extremity to any suitable portion of the vehicle.

Arranged within the drum 10 is another drum like member 18 which is hollow and is held against rotation by means of an angular portion 19 of the trunnion 12 passing into an angular shaped opening 20 in the body portion of the drum 18, the extremity 21 of the trunnion 12 passing beyond the body portion of the drum 18 and being provided with threads adapted to receive a nut 22, the body portion 23 of the nut 22 being reduced about its periphery, for a purpose to be hereinafter described.

The periphery 24 of the fixed or stationary drum 18 is spaced from the periphery 14 of the drum 10 for a considerable distance and arranged within this space is a split friction creating member or band 25.

Arranged within the drum 18 is a coiled spring 26, one end of which is anchored as at 27 to the drum 18 and the other end of the spring is anchored as at 28 to the bearing or hub of the rotatable drum 10. The anchor for the inner end of the spring 26 may be provided by forming a projection 29 on the hub of the drum 18 and over which projection the end 28 of the spring is adapted to engage. The spring 26 is so coiled that when the flexible member 15 is unwound from the drum 10 to rotate the latter the spring 26 will be coiled up to store energy therein so that when the band or member 15 becomes slack the energy stored in the spring 26 will cause the drum 10 to rotate to wind up thereupon the flexible member 15.

The ends of the friction creating member 25 terminate short of each other and the member is secured to the stationary drum by one end thereof through the medium of a spring 30. One end 31 of the spring 30 is seated in an eye 32, which in turn is secured to the periphery 24 of the drum 18. The other end 33 of the spring 30 is seated in an eye 34 carried by a resilient member 35 which in turn is secured to the inner face of the friction creating member 25. The tendency of the resilient member 35 is to normally expand the friction creating member 25 within the drum 10 but only with sufficient force that the outer surface of the friction creating member 25 will stand in close proximity to the inner face of the periphery 14 of the drum 10, that the drum 15 may have a free oscillatory movement for a limited extent about the drum 18 under normal conditions.

The drum 10 will also have a free movement with relation to the drum 18 in one direction, or in the direction of movement of the drum 10, which will cause the flexible member 15 to be wound thereupon.

When, however, the drum 10 is rotated in the opposite direction with respect to the drum 18 the resilient member 35 will hold the friction creating element 25 in contact with the inner periphery 14 of the drum 10 with sufficient friction at the commencement of the movement of the drum 10 in said direction to cause the friction creating member 25 to be expanded or opened, thereby increasing the degree of friction between the friction creating member and the drum 10 to retard the return movement of the drum 10.

This is accomplished by reason of the fact that the friction creating element 25 is anchored at one end and also by reason of the fact that when the drum 10 rotates backwardly the friction creating element 25 will expand.

Upon the forward movement of the drum 10 with respect to the drum 18 the friction creating member will be contracted and the degree of friction will be reduced.

In order to increase the initial degree of friction between the friction creating element 25 and the inner face of the periphery 14 of the drum 10, there is provided a member 36 which extends between the periphery 24 of the drum 18 and the adjacent face of the friction creating element 25. This member 36 is preferably provided with a lug or projection 37 which enters a recess 38 in the adjacent portion of the friction creating element 25, preferably in proximity to the extremity 39 of the friction creating element, so as to secure the latter together to prevent accidental displacement.

The member 36 extends over and rests against the body portion of the drum 18 as at 40. Another member 41 co-operates with the portion 40 of the member 36 and this member 41 is provided with an opening therein into which the reduced portion 23 of the nut 22 projects, the portion 23 of the nut forming a bearing for the member 41, about which the member 41 moves, and the shoulder 42 formed by the reduced portion 23 of the nut 22 prevents displacement of the member 41. Anti-friction devices 43 may be provided on the portions 40 of the member 36 which move against the adjacent face of the drum 18. The portions 40 of the member 36 and the member 41 preferably overlap, and anti-friction devices 44 may be interposed between the overlapping portions. A coiled spring 45 is interposed between the member 41 and the member 36, one end of the spring preferably resting against a nut 46 which is threaded upon a member 47 carried by the member 36. The other end of the spring preferably engages over a projection 48 carried by the member 41 and which projection 48 is disposed preferably between two upstruck portions 49 on the member 41 to serve as a protection for the spring.

The normal tendency of the spring 45 is to force the member 36 into contact with the friction creating element or member 25, and the latter into contact with the inner face of the periphery 14 of the drum 10.

With this construction the degree of friction between one end of the friction creating member 25 and the periphery 14 of the drum 10 will be such that when the spring 26 operates upon the drum 10 to cause the flexible member 15 to be wound thereupon, the periphery 14 of the drum 10 will slip with respect to the friction creating element, but when the drum 10 is rotated in the opposite direction to permit the flexible member 15 to be unwound therefrom, the friction created between the face of the friction creating element 15 and the periphery 14 of the drum 10 will cause the friction creating member to expand, thereby increasing the degree of friction between these parts to retard such movement of the drum 10.

In order to control the maximum degree of friction between these parts or what is known as the peak load of friction, there is provided a lug or projection 50 carried by the drum 18. This projection 50 is arranged within the path of movement of a projection 51 that is carried by the friction creating element 25 preferably by being formed on the resilient member 35 which is connected with the element 25.

The spring 30 is provided with a predetermined degree of stress against which the movement of the friction creating member 25 operates when the friction member 25 is active to retard the relative degree of rotary movement of the drums. That is to say, when the friction creating element moves with the drum 10 to retard the movement of the latter, the drum will tend to expand the friction creating member, and the movement of the friction creating element with the drum 10 would, in the absence of the projections 50—51 continue until the ends 31 and 33 of the spring 30 are brought into contact with each other. That is to say until the stress of the spring 30 is entirely overcome.

By providing the projections 50 and 51 the degree of compression of the spring 30 on what is termed the load end of the friction member 25, that is where it is anchored to the drum 18 at the point where the spring 30 is arranged, may be controlled. This is accomplished by arranging the projections 50 and 51 at predetermined points with respect to the cycle of operation of the device or movement of the drum 10. The projection 50 is so arranged that the projection 51 carried by the friction member 25 will contact therewith at the time that the friction creating member is being carried or expanded by the movement of the drum 10 just at the time when the maximum degree of friction is produced by the compression of the spring 30.

That is to say, the projections 50 and 51 may be so arranged with respect to each other that the spring 30 will be compressed only to a predetermined amount, the spring 30 serving as a cushion between the load end of the friction creating element 25 and the drum 18.

As soon as the projection 51 moves away from the projection 50 under the influence of the spring 26, the spring 30 will again expand and the parts will assume their normal positions, the friction creating element 25 under such movement being contracted sufficiently to permit a free movement of the drum 10 with respect to the drum 18.

It will therefore be seen that with this improved construction the degree of friction at the high point or at the peak load of friction may be controlled or predetermined by the arrangement of the lugs 50 and 51 with respect to each other in the cycle of operation or relative movement of the drum 10 with respect to the drum 18.

A cap 52 (see Figure 5) may be provided for the drum 10 and this cap may be removably held in position in any suitable manner, preferably by means of a split ring 53 which is adapted to be sprung over the edges of the cap and the adjacent edge of the periphery 14 of the drum 10.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A shock absorbing device including two members relatively movable one with relation to the other and spaced from each other, a friction element interposed between said members, means yieldingly connecting one end of said friction element with one of said members, said members having a free relative movement in one direction, and means responsive to the relative movement of the said members in the opposite direction for causing said friction creating element to retard the relative movement of the said members in the last recited direction and for bodily moving the said friction element against the stress of the said yielding connection.

2. A shock absorbing device including two members relatively movable one with relation to the other and spaced from each other, a friction element interposed between said members, means yieldingly connecting one end of said friction element with one of said members, said members having a free relative movement in one direction, means responsive to the relative movement of the said members in the opposite direction for causing said friction creating element to retard the relative movement of the said members in the last recited direction and for bodily moving the said friction element against the stress of the said yielding connection, and means for controlling the degree of friction created by the said friction element.

3. A shock absorbing device including two members relatively movable one with relation to the other and spaced from each other, a friction element interposed between said members, means yieldingly connecting one end of said friction element with one of said members, said members having a free relative movement in one direction, means responsive to the relative movement of the said members in the opposite direction for causing said friction creating element to retard the relative movement of the said members in the last recited direction and for bodily moving the said friction element against the stress of the said yielding connection, and means for controlling the stress of the said yielding connection for controlling the degree of friction created by the said friction element.

4. A shock absorbing device including two members relatively movable one with relation to the other and spaced from each other, a friction element interposed between said members, means yieldingly connecting one end of said friction element with one of said members, said members having a free relative movement in one direction, means responsive to the relative movement of the said members in the opposite direction for causing said friction creating element to retard the relative movement of the said members in the last recited direction and for bodily moving the said friction element against the stress of the said yielding connection, and interengaging means operatively related to one of the said members and the said friction element for controlling the degree of friction between the said element and the other of the said members.

5. A shock absorbing device embodying a non-rotative drum like member, a second drum like member rotative about the first said member and spaced therefrom, a friction element interposed between said member and surrounding the periphery of the non-rotative member, a flexible draft member, means tending normally to wind the draft member upon the said rotative member, said members having a free relative movement in one direction, means responsive to the relative movement of the members in the opposite direction for causing said friction element to retard the relative movement of the said member in the last recited direction, and means rendered active at a predetermined time in the cycle of operation of the device for controlling the maximum degree of friction created by the said friction element.

6. A shock absorber embodying two members relatively movable one with relation to the other and spaced from each other, a friction element interposed between said members, said members having a free relative movement in one direction, means responsive to the relative movement of the said members in the opposite direction for causing said friction element to create an increasing degree of friction to retard the relative movement of the members in the last recited direction, and means rendered active at a predetermined time in the cycle of operation of the device for controlling the maximum degree of such friction.

7. A shock absorber embodying two members relatively movable one with relation to the other and spaced from each other, a friction element interposed between said members, said members having a free relative movement in one direction, means responsive to the relative movement of the said members in the opposite direction for causing said friction element to create an increasing degree of friction to retard the relative movement of the members in the last recited direction, and means for controlling the maximum degree of such friction, the last recited means including a resilient connection between one of said members and the said friction element and against the stress of which connection the friction element operates during such increase in the degree of friction, and means for arresting the operation of the said friction element against the stress of said connection.

8. A shock absorber embodying concentrically arranged drum like members, an open band like element disposed between the members, a resilient element connecting one end of said element with one of the members and against the stress of which resilient element the said band is bodily movable by the friction created between said band and the other of said members when the members are relatively moved in one direction, and means responsive to the last recited relative movement of the members for causing said band like element to retard such relative movement of the said members.

9. A shock absorber embodying concentrically arranged drum like members, an open band like element disposed between the members, a resilient element connecting one end of said element with one of the members and against the stress of which resilient element the said band is bodily movable by the friction created between said band and the other of said member when the members are relatively moved in one direction, means responsive to the last recited relative movement of the members for causing the said band like element to retard such relative movement of the said members, and means for controlling the extent of bodily movement of the said band like element against the stress of the said resilient element.

10. A shock absorber embodying concentrically arranged drum like members, an open band like element disposed between the members and extending partially about one of the members, said members being freely rotative in one direction one with relation to the other, a resilient element connecting one end of the said band with one of said members, and means operatively connected with the other of said members and operable upon said band when the members are relatively rotated in another direction to bodily move the said band against the stress of the said resilient element and thereby frictionally retard the last recited relative movement of said members.

11. A shock absorber embodying concentrically arranged drum like members, an open band like element disposed between the members and extending partially about one of the members, said members being freely rotative in one direction one with relation to the other, a resilient element connecting one end of the said band with one of said members, means operatively connected with the other of said members and operable upon said band when the members are relatively rotated in another direction to bodily move the said band against the stress of the said resilient element and thereby frictionally retard the last recited relative movement of said members, and means for controlling the maximum degree of friction exerted by the said band.

12. A shock absorber embodying concentrically arranged drum like members, an open band like element disposed between the members and extending partially about one of the members, said members being freely rotative in one direction one with relation to the other, a resilient element connecting one end of the said band with one of said members, means operatively connected with the other of said members and operable upon said band when the members are relatively rotated in another direction to bodily move the said band against the stress of the said resilient element and thereby frictionally retard the last recited relative movement of said members, and means for limiting the extent of stress exerted upon the said resilient element by the said bodily movement of the said band.

13. A shock absorber embodying concentrically arranged drum like members, an open band like element disposed between the members and extending partially about one of the members, said members being freely rotative in one direction one with relation to the other, a resilient element connecting one end of the said band with one of said members, means operatively connected with the other of said members and operable upon said band when the members are relatively rotated in another direction to bodily move the said band against the stress of the said resilient element and thereby frictionally retard the last recited relative movement of said members, and a stop for limiting the said bodily movement of the said band for controlling the maximum degree of stress exerted by the said band upon the said resilient element.

14. A shock absorber embodying concentrically arranged drum like members, an open band like element disposed between the members and extending partially about one of the members, said members being freely rotative in one direction one with relation to the other, a resilient element connecting one end of the said band with one of said members, means operatively connected with the other of said members and operable upon said band when the members are relatively rotated in another direction to bodily move the said band against the stress of the said resilient element and thereby frictionally retard the last recited relative movement of said members, means for controlling the maximum degree of friction exerted by the said band, a flexible draft element adapted to be wound upon and unwound from one of said drums, and means tending normally to wind said draft element upon the last said drum.

15. A shock absorber embodying concentrically arranged drum like members, an open band like element disposed between the members, and resilient means disposed between said band and one of the said members and continuously tending to bodily move said band in a general direction about the pivot of one of said members when the said members are relatively moved in one direction, said band frictionally engaging the other of the said members to be bodily moved therewith and against the stress of the said resilient means when the said members are relatively moved in the opposite direction, thereby creating an increasing friction to retard the last recited relative movement of said members.

16. A shock absorber embodying concentrically arranged drum like members, an open band like element disposed between the members, resilient means disposed between said band and one of the said members and continuously tending to bodily move said band in a general direction about the pivot of one of said members when the said members are relatively moved in one direction, said band frictionally engaging the other of the said members to be bodily moved therewith and against the stress of the said resilient means when the said members are relatively moved in the opposite direction, thereby creating an increasing friction to retard the last recited relative movement of said members, and means for controlling the maximum degree of friction thus created.

17. A shock absorber embodying concentrically arranged drum like members, an open band like element disposed between the members, resilient means disposed between said band and one of the said members and continuously tending to bodily move said band in a general direction about the pivot of one of said members when the said members are relatively moved in one direction, said band frictionally engaging the other of the said members to be bodily moved therewith and against the stress of the said resilient means when the said members are relatively moved in the opposite direction, thereby creating an increasing friction to retard the last recited relative movement of said members, and means individual to and operatively connected with one of said members and the said band like element and adapted to be brought into engagement to limit the stress exerted upon the said resilient means by the said band for controlling the maximum degree of friction created by said band.

18. A shock absorbing device including two members relatively movable one with relation to the other, friction creating material interposed between the opposed faces of said members, and resiliently yielding means connecting said friction material with one of said members, said friction material being rendered inactive by the relative movement of said member in one direction and rendered active by the relative movement of the member in the opposite direction whereby frictional resistance will retard the relative movement of said members in one direction only.

19. A shock absorbing device including two members relatively movable one with relation to the other, friction creating material interposed between the opposed faces of said members, resiliently yielding means connecting said friction material with one of said members, said friction material being rendered inactive by the relative movement of said member in one direction and rendered active by the relative movement of the member in the opposite direction whereby frictional resistance will retard the relative movement of said members in one direction only, and means for controlling the degree of friction created by the said friction material.

In testimony whereof I have signed my name to this specification, on this 18th day of September, A. D. 1926.

EDWARD L. LEINBACH.